United States Patent
Zhang et al.

(10) Patent No.: US 8,396,889 B2
(45) Date of Patent: Mar. 12, 2013

(54) METHODS FOR SEMANTICS-BASED CITATION-PAIRING INFORMATION

(75) Inventors: Paul Zhang, Centerville, OH (US); Harry Silver, Shaker Heights, OH (US); Timothy L. Humphrey, Centerville, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 238 days.

(21) Appl. No.: 12/869,413

(22) Filed: Aug. 26, 2010

(65) Prior Publication Data
US 2012/0054240 A1    Mar. 1, 2012

(51) Int. Cl.
*G06F 17/30* (2006.01)
(52) U.S. Cl. ......... 707/780; 707/728; 707/933; 715/210
(58) Field of Classification Search .................. 707/771, 707/780, 933, 728, 802, 930; 715/201, 210, 715/256, 266, 268, 277
See application file for complete search history.

(56) References Cited

U.S. PATENT DOCUMENTS

| | | | | |
|---|---|---|---|---|
| 5,375,235 A * | 12/1994 | Berry et al. | .................. | 707/730 |
| 5,594,897 A * | 1/1997 | Goffman | ....................... | 707/802 |
| 5,638,543 A * | 6/1997 | Pedersen et al. | ................... | 704/1 |
| 5,642,522 A * | 6/1997 | Zaenen et al. | ................. | 715/246 |
| 5,835,087 A * | 11/1998 | Herz et al. | .................... | 715/810 |
| 5,848,410 A * | 12/1998 | Walls et al. | ................... | 707/727 |
| 5,918,236 A * | 6/1999 | Wical | ............................. | 715/209 |
| 6,038,574 A | 3/2000 | Pitkow et al. | | |
| 6,085,185 A * | 7/2000 | Matsuzawa et al. | .......... | 707/802 |
| 6,182,066 B1 | 1/2001 | Marques | | |
| 6,286,018 B1 | 9/2001 | Pitkow et al. | | |
| 6,289,342 B1 | 9/2001 | Lawrence et al. | | |
| 6,457,028 B1 | 9/2002 | Pitkow et al. | | |
| 6,738,780 B2 | 5/2004 | Lawrence et al. | | |
| 6,799,176 B1 | 9/2004 | Page | | |
| 6,856,988 B1 | 2/2005 | Humphrey et al. | | |
| 7,003,719 B1 * | 2/2006 | Rosenoff et al. | ............... | 715/205 |
| 7,058,628 B1 | 6/2006 | Page | | |
| 7,246,310 B1 | 7/2007 | Wolfe | | |
| 7,302,638 B1 | 11/2007 | Wolfe | | |
| 7,340,466 B2 | 3/2008 | Odom et al. | | |
| 7,464,025 B2 | 12/2008 | Humphrey et al. | | |
| 7,593,920 B2 | 9/2009 | Jackson et al. | | |
| 7,620,626 B2 | 11/2009 | Jackson et al. | | |
| 7,680,648 B2 | 3/2010 | Elbaz et al. | | |
| 7,716,226 B2 | 5/2010 | Barney | | |
| 2007/0130100 A1 | 6/2007 | Miller | | |
| 2007/0239706 A1 | 10/2007 | Zhang et al. | | |
| 2008/0071803 A1 | 3/2008 | Boucher | | |

(Continued)

OTHER PUBLICATIONS

PCT/US2011/047382, International Search Report.

(Continued)

*Primary Examiner* — Shahid Alam
(74) *Attorney, Agent, or Firm* — Dinsmore & Shohl LLP (57) ABSTRACT

A computer-implemented method of semantically linking, by a computing device, a citing document to a cited document in a corpus of documents includes locating at least one citation present in the citing document, determining a reason-for-citing for at least one citation, and determining a cited-text-area present in the cited document, wherein the cited-text-area corresponds with the reason-for-citing. The method further includes populating a citation entry of a citation-pairing metadata file with a citing-document identifier, a reason-for-citing identifier, a cited-document identifier, and a cited-text-area identifier. The citation-pairing metadata file includes a plurality of citation entries and is stored separately from the citing document and the cited document.

17 Claims, 7 Drawing Sheets

U.S. PATENT DOCUMENTS

| | | | |
|---|---|---|---|
| 2008/0178077 A1* | 7/2008 | Boucher | ........................ 715/266 |
| 2009/0043797 A1 | 2/2009 | Dorie et al. | |
| 2010/0082634 A1 | 4/2010 | Leban | |
| 2010/0125601 A1 | 5/2010 | Jackson et al. | |
| 2010/0161611 A1 | 6/2010 | Guo et al. | |

OTHER PUBLICATIONS

Office Action Summary dated May 7, 2012; original filing date Aug. 26, 2010; U.S. Appl. No. 12/869,456.

* cited by examiner

CITATION NETWORK

METHODS FOR SEMANTICS-BASED CITATION-PAIRING INFORMATION

CROSS REFERENCE TO RELATED APPLICATIONS

This application is related to U.S. patent application Ser. No. 12/869,456 entitled "Methods for Semantics-Based Citation-Pairing Information," filed on Aug. 26, 2010; U.S. Pat. No. 7,735,010 entitled "Citation Network Viewer and Method," filed Apr. 5, 2006; and U.S. Pat. No. 6,856,988 entitled "Automated System and Method for Generating Reasons That a Court Case is Cited," filed Dec. 21, 1999, but does not claim priority thereto, all of which are incorporated by reference in their entireties.

BACKGROUND

1. Field

The present specification generally relates to methods for linking documents and, more particularly, to methods for the creation of metadata for the storage of information relating to semantically-linked documents of a document corpus.

2. Technical Background

Documents within a corpus are often linked together by citations. For example, legal documents and scientific articles often cite to previous works to support a particular rule, proposition or finding. In the legal corpus context, an author of a judicial opinion often cites previous cases in support of his or her own legal statement or rule. In turn, these cited cases have themselves also cited and/or been cited by other cases in support of the proposition-in-question (and so on). Therefore, selected documents within the corpus are intrinsically linked together around particular issues, and these links can be manifested in the form of citation networks.

Researchers often search the corpus for documents that discuss a particular issue or topic. They will use the citations to move forward and backward within the corpus to find additional relevant documents. However, documents, such as legal documents, may discuss many different topics or legal issues. Further, a document may cite a document for many different reasons. Two citations pointing to the same document may cite to the same document for different reasons. Currently, the researcher does not know the particular issue or topic that a citing document is citing a cited document for based on the citation alone. The researcher must therefore sift through the many different cited documents.

Accordingly, a need exists for alternative methods of linking documents within corpus of documents such that the documents are linked semantically at the passage level and information regarding the semantic links may be easily and efficiently stored and accessed.

SUMMARY

In one embodiment, a computer-implemented method of semantically linking a citing document to a cited document in a corpus of documents includes locating at least one citation present in the citing document, determining a reason-for-citing for the at least one citation and determining a cited-text-area present in the cited document, wherein the cited-text-area corresponds with the reason-for-citing. The method further includes populating a citation entry of a citation-pairing metadata file with a citing-document identifier, a reason-for-citing identifier, a cited-document identifier, and a cited-text-area identifier. The citation-pairing metadata file includes a plurality of citation entries and is stored separately from the citing document and the cited document.

In another embodiment, a computer-implemented method of storing semantics-based citation-pairing information includes generating a citation-pairing metadata file, writing a plurality of citation entries to the citation-pairing metadata file for individual ones of a plurality of documents included in a corpus of documents, and electronically storing the citation-pairing metadata file separately from the plurality of documents of the corpus of documents. Each citation entry includes a citing-document identifier corresponding to a citing document, a reason-for-citing identifier corresponding to a reason-for-citing for a citation of the citing document, a cited-document identifier corresponding to a cited document cited by the citing document, and a cited-text-area identifier corresponding to an area of text cited in the cited document that is cited by the citing document.

In yet another embodiment, a computer-readable memory includes a set of computer-readable instructions for carrying out a method of semantically linking a citing document to a cited document. When the computer-readable instructions are used in conjunction with a computer having a processor, the processor causes the computer to determine a reason-for-citing for at least one citation present in the citing document, determine a cited-text-area present in a cited document, wherein the cited-text-area corresponds with the reason-for-citing, and populate a citation entry of a citation-pairing metadata file with a citing-document identifier, a reason-for-citing identifier, a cited-document identifier, and a cited-text-area identifier. The citation-pairing metadata file includes a plurality of citation entries and is stored separately from the citing document and the cited document.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Embodiments described herein are directed to methods for semantically linking documents within a document corpus and storing information related to such semantically-linked documents. Methods described herein create a database of metadata that is composed of one-to-one pairing relationships of documents at the passage level. Embodiments create a corpus of metadata comprising semantically equivalent text passages. Reasons-for-citing are determined for one or more citing and cited documents in the corpus. The reasons-for-citing in the citing document are compared with reasons-for-citing and/or cited-text-areas in each cited document. Text areas in the cited documents having the greatest similarity to text of the reasons-for-citing in the citing documents are paired. Information relating to the semantic pairing is stored in a citation-pairing metadata file or files. The citation-pairing metadata file may be accessed and utilized to link passages from different documents discussing the same topic or issue. In this manner, similar passages from separate documents are linked. As an example, embodiments may improve search results when an end-user finds a particular passage and desires to find more documents having similar passages.

Although the embodiments are described herein in the context of a corpus of legal documents, it should be understood that embodiments are not limited thereto. For example, the methods described herein may be utilized to create and store citation-pairing metadata for legal documents, scientific research documents, news articles, journals, and any other type of large corpus of documents where documents are linked by citations.

Figure 1:
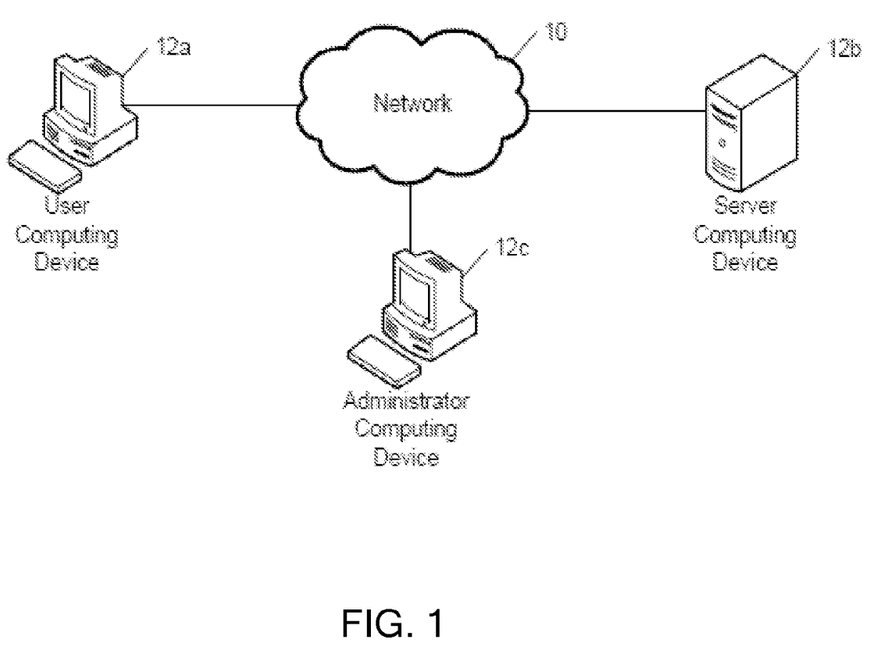
FIG. 1 depicts a schematic illustration of a computing network for a system for semantically pairing documents, according to embodiments shown and described herein.

Referring now to the drawings, FIG. 1 depicts an exemplary computing network, illustrating components for a system for semantically linking documents within a corpus, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to input one or more documents into an electronic document corpus as well as initiate the creation of citation paring metadata. The user computing device 12c may also be utilized to perform other user functions. Additionally, included in FIG. 1 is the administrator computing device 12c. In the event that the server computing device 12b requires oversight, updating, or correction, the administrator computing device 12c may be configured to provide the desired oversight, updating, and/or correction.

It should be understood that while the user computing device 12a and the administrator computing device 12c are depicted as personal computers and the server computing device 12b is depicted as a server, these are nonlimiting examples. More specifically, in some embodiments any type of computing device (e.g. mobile computing device, personal computer, server, etc.) may be utilized for any of these components. Additionally, while each of these computing devices is illustrated in FIG. 1 as a single piece of hardware, this is also a nonlimiting example. More specifically, each of the user computing device 12a, server computing device 12b, and administrator computing device 12c may represent a plurality of computers, servers, databases, etc.

Figure 2:
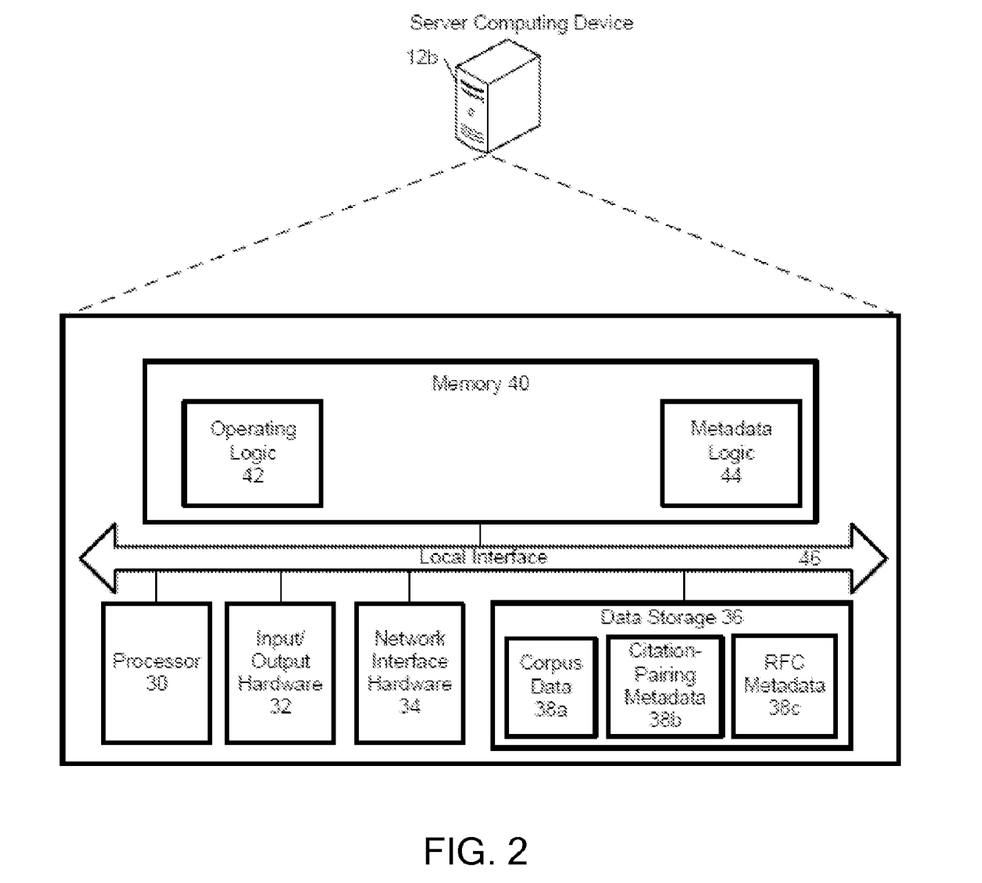
FIG. 2 depicts a schematic illustration of the server computing device from FIG. 1, further illustrating hardware and software that may be utilized in performing the semantics-based citation pairing functionality, according to embodiments shown and described herein.

FIG. 2 depicts the server computing device 12b, from FIG. 1, further illustrating a system for semantically pairing document and/or a non-transitory computer-readable medium for semantically linking documents embodied as hardware, software, and/or firmware, according to embodiments shown and described herein. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which stores corpus data 38a, citation-pairing metadata 38b, and reasons-for-citing metadata 38c), and a memory component 40. The memory component 40 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42 and metadata logic 44 (each of which may be embodied as a computer program, firmware, or hardware, as an example). A local interface 46 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 stores corpus data 38a, which in at least one embodiment, includes legal and/or other documents that have been organized and indexed for searching. The legal documents may include case decisions, briefs, forms, treatises, etc. Similarly, citation-pairing metadata 38b generated by the metadata logic 44a may be stored by the data storage component 36 and may include information relating to the semantically linked documents. Reasons-for-citing metadata 38c may also be stored by the data storage component 36 and may include data related to the text excerpts corresponding citations present in documents of the corpus.

Included in the memory component 40 is the operating logic 42 and the metadata logic 44. The operating logic 42 may include an operating system and/or other software for managing components of the server computing device 12b. Similarly, the metadata logic 44 may reside in the memory component 40 and may be configured to facilitate electronic generation of the citation-pairing and reasons-for-citing metadata as described in detail below. The metadata logic 44 may be configured to compile and/or organize metadata to enable additional user applications, such as electronic document search and retrieval.

It should be understood that the components illustrated in FIG. 2 are merely exemplary and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12b may include similar hardware, software, and/or firmware.

Figure 3A:
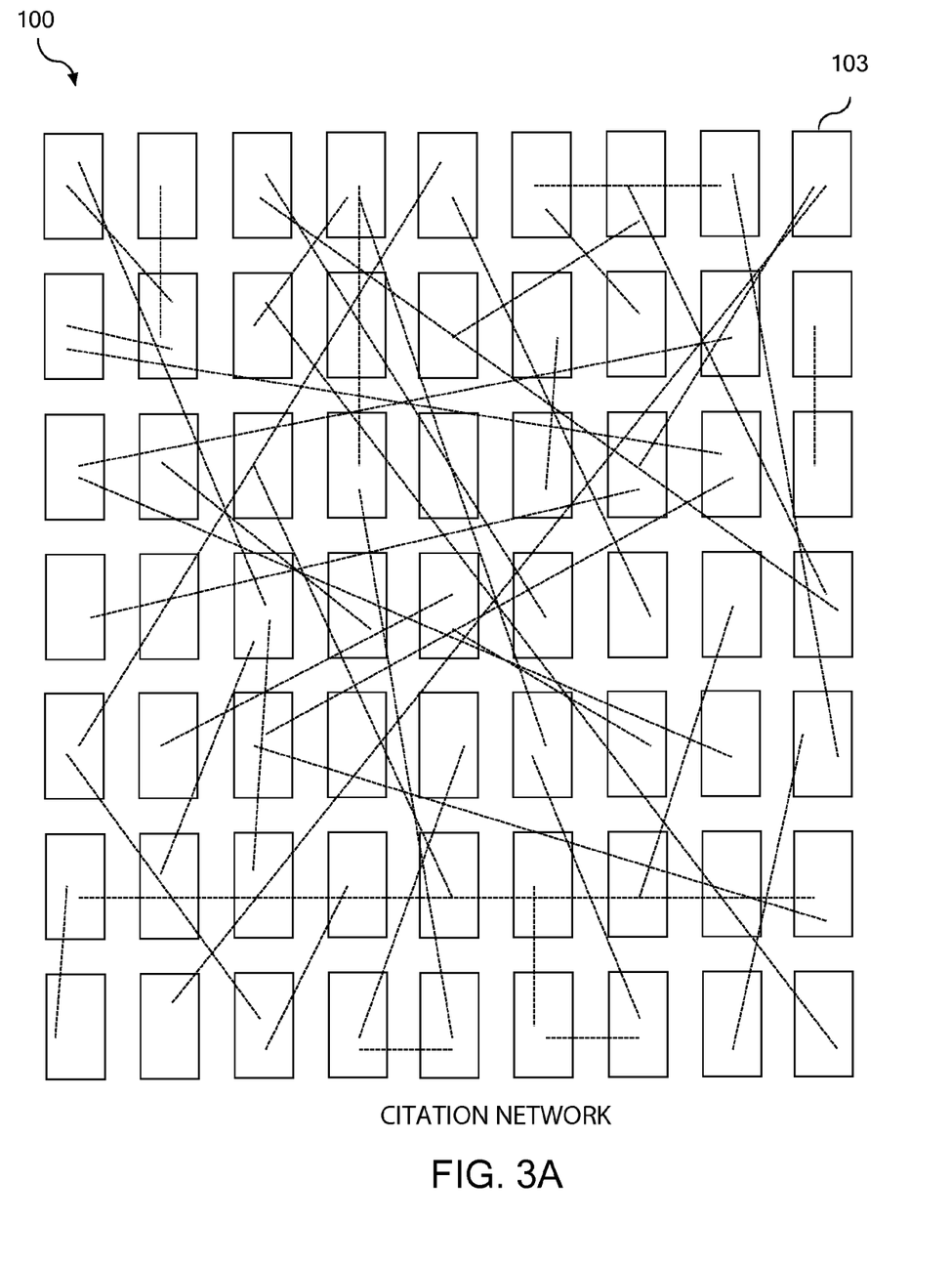
FIG. 3A depicts a schematic illustration of a document corpus according to one or more embodiments shown and described herein.

Referring initially to FIG. 3A, a corpus 100 of documents is illustrated. Within the corpus 100 are individual documents 103 that are linked via citations. For example, a citing document may include a citation that references a particular passage or text area of a cited document. The cited document may further cite other documents and so on. The citations and linked documents form a citation network within the corpus 100.

The corpus 100 of documents may be a legal corpus comprising many individual judicial opinions. In some common-law countries, such as the United States, the legal system is based on stare decisis, wherein judges are obligated to follow the precedents established by prior judicial decisions. When preparing a judicial or legal opinion, the judge or person preparing the opinion must cite to documents to support particular rules, statements and facts. A citation is commonly located proximate to a reason-for-citing, i.e., the string of text that is located near the citation and suggests the reason for the particular citation to the cited document. Legal research is often performed by searching prior and subsequent cases of a legal issue based on citations located within each document. Therefore, knowing and understanding the reasoning why cases are linked together within the corpus 100 may be beneficial for efficient legal research.

Within the citation network of the corpus 100 exists a plurality of semantics-based sub-networks that are each relevant to a particular issue or sub-issue. For example, one legal issue may be related to when it is appropriate for new arguments to be introduced on appeal. Embodiments record information regarding the links between documents of the various sub-networks within a citation-pairing metadata file (or files) that is stored separately from the documents 103 within the corpus 100.

Figure 3B:
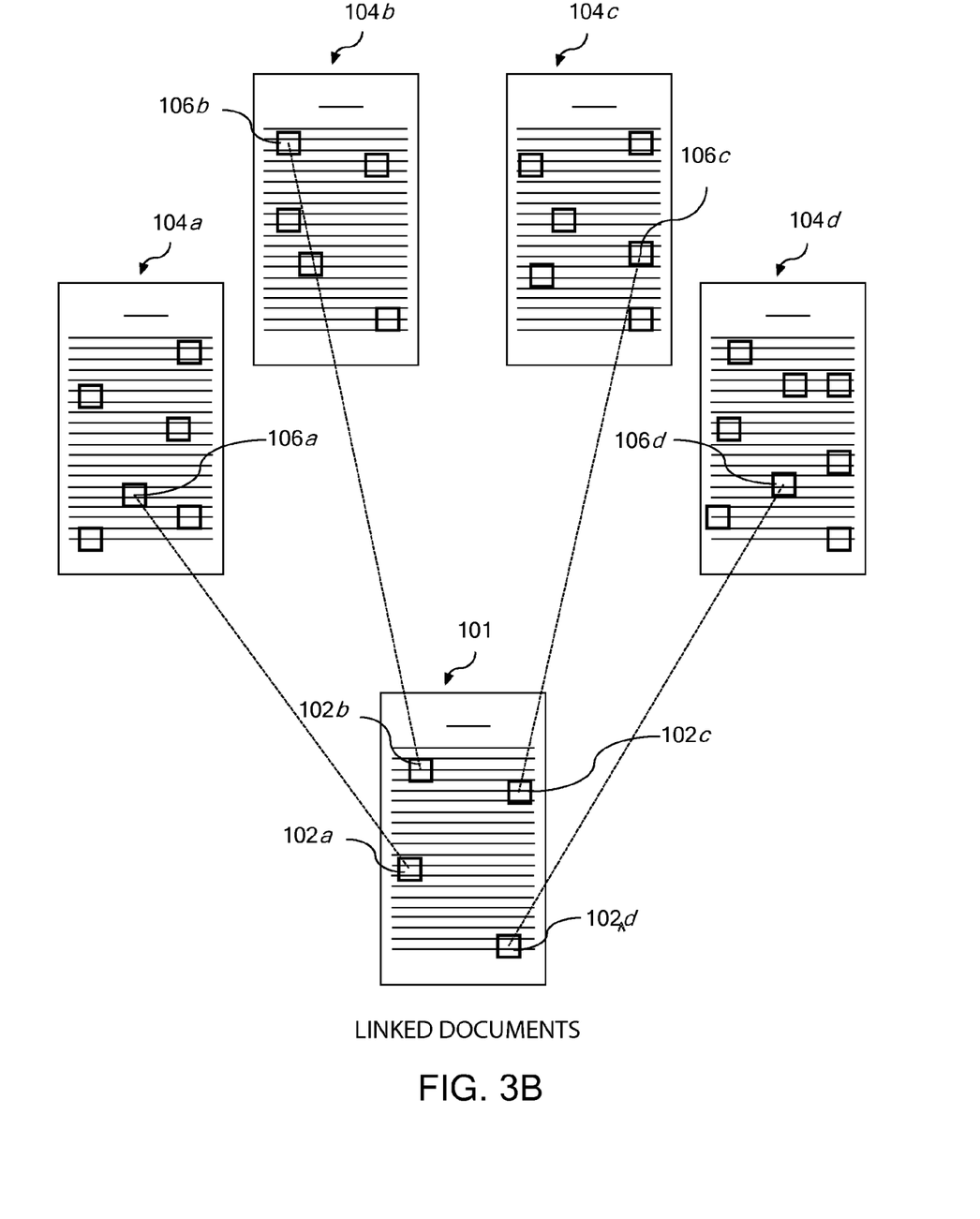
FIG. 3B depicts a schematic illustration of a relationship between a citing document and a plurality of cited documents according to one or more embodiments shown and described herein.

FIG. 3B illustrates a citing document 101 and a plurality of cited documents 104a-d. The illustrated citing document 101 has four citations and corresponding reasons-for-citing 102a-d. Each reason-for-citing 102a-d is located proximate to a citation within the cited document 101. The citations link the citing document 101 to the plurality of cited documents 104a-d. The drafter of the citing document 101 has a particular reason for citing each cited document 104. For example, the drafter of the citing document may wish to incorporate a particular rule from cited document 104a into the cited document. The cited-text-area 106a of cited document 104a may recite the particular rule that corresponds with the reason-for-citing 102a of the citing document 101. The reason-for-citing 102a and cited-text-area 106a may be very similar semantically but on the surface structure may be fairly different because different words and phrase may exist between the two text areas. As illustrated, the citing document 101 and cited document 104a are linked at both a document level and a passage level. Similarly, reason-for-citing 102b is semantically linked to cited-text-area 106b of cited document 104b, reason-for-citing 102c is semantically linked to cited-text-area 106c of cited document 104c, and reason-for-citing 102d is semantically linked to cited-text-area 106d of cited document 104d.

However, the citations only identify the particular cited documents cited by a citing document, and not the particular text area or passage that is being cited. Current pairing techniques are asymmetric because a reason-for-citing is at the citing document end of the link, but at the other end it is the whole case: Case_X:Reason_For_Citing_a→Case_Y. Embodiments described herein enable cases to be linked at the passage level on both ends of the link and store citation entries within a citation-pairing metadata file that contains information regarding the semantically linked pairing.

The citation-pairing metadata file specifies the citation relationship between two cases at the semantic level (i.e., at the passage level). The citation-pairing metadata file contains a citation entry for each reason-for-citing of every document within the corpus (or a select group of documents within the corpus). Below is an example of a citation entry format of one embodiment:

CitingCaseID:Reason-For-CitingID::CitedCaseID: CitedTextAreaID::SimilarityValue

The CitingCaseID and CitedCaseID fields of the above example are a citing-document identifier and a cited case identifier, respectively. These identifiers contain information that point to particular documents within the corpus. Within each citing document are a plurality of reasons-for-citing or rules. For example and not limitation, the citing case may have 20 citations and therefore 20 corresponding reasons-for-citing. The Reason-For-CitingID field is a reason-for-citing identifier that points to the particular reason-for-citing within the citing document. For example, the reason-for-citing identifier may point to the fifth reason-for-citing in the citing document, which may be for a particular rule of law.

A plurality of reasons-for-citing or rules are also present within each cited document. If the document is a legal document and the cited document is cited for a legal issue, there is usually a text area in the document that discusses the legal issue, and in most cases, the cited-text-area is located near another citation referencing another case. Therefore, there is a high likelihood that the reason-for-citing in the citing document is referring to a cited-text-area that corresponds to a reason-for-citing in the cited document. The CitedTextAreaID field is a cited-text-area identifier and commonly points to a reason-for-citing in the cited document.

The value present in the SimilarityValue field represents the relative semantic similarity between the text associated with the Reason-For-CitingID and the text associated with the CitedTextAreaID. The SimilarityValue will be described in more detail below.

An example of a citation entry included in a citation-pairing metadata file is provided below. It should be understood that the format and content of the exemplary citation entry may vary and embodiments are not limited thereto.

A72D7FE70BE40038:R_1::A26169830BE40246: R_5::0.832590108

In the above example, "A72D7FE70BE40038" is the citing-document identifier and may point to the case *Rolley, Inc. v. Merle Norman Cosmetics, Inc.*, 129 Cal. App. 2d 844, for example. R__1 is the reason-for-citing identifier and corresponds to the first reason-for-citing in the citing case. As described in more detail below, the Reason-For-CitingID may point to an entry in a separate reason-for-citing metadata file. In the above example, R__1 of citing document Rolley, Inc. may state that:

"Appellate courts cannot submit to piecemeal argument and will not consider on petition for rehearing questions not previously raised."

CitedCaseID A26169830BE40246 may point to the cited case *Bradley* v. *Bradley*, 94 Cal. App. 2d 310, for example. The CitedTextID of R__5 indicates that the cited-text-area of the cited case is the fifth reason-for-citing. R__5 may point to an entry in a reason-for-citing metadata file that the fifth reason-for-citing in Bradley states:

"The case having been tried on the theory that condonation was not an issue appellant under settled principles cannot now change his theory [***3] appeal to the disadvantage of respondent."

Therefore, the above exemplary citation entry states that "*Rolley, Inc.* v. *Merle Norman Cosmetics, Inc.*" cited "*Bradley* v. *Bradley*" for the legal issue of the ability for a party to raise new issues on appeal with a similarity measure between the two reasons-for-citing of about 0.8.

Figure 4:
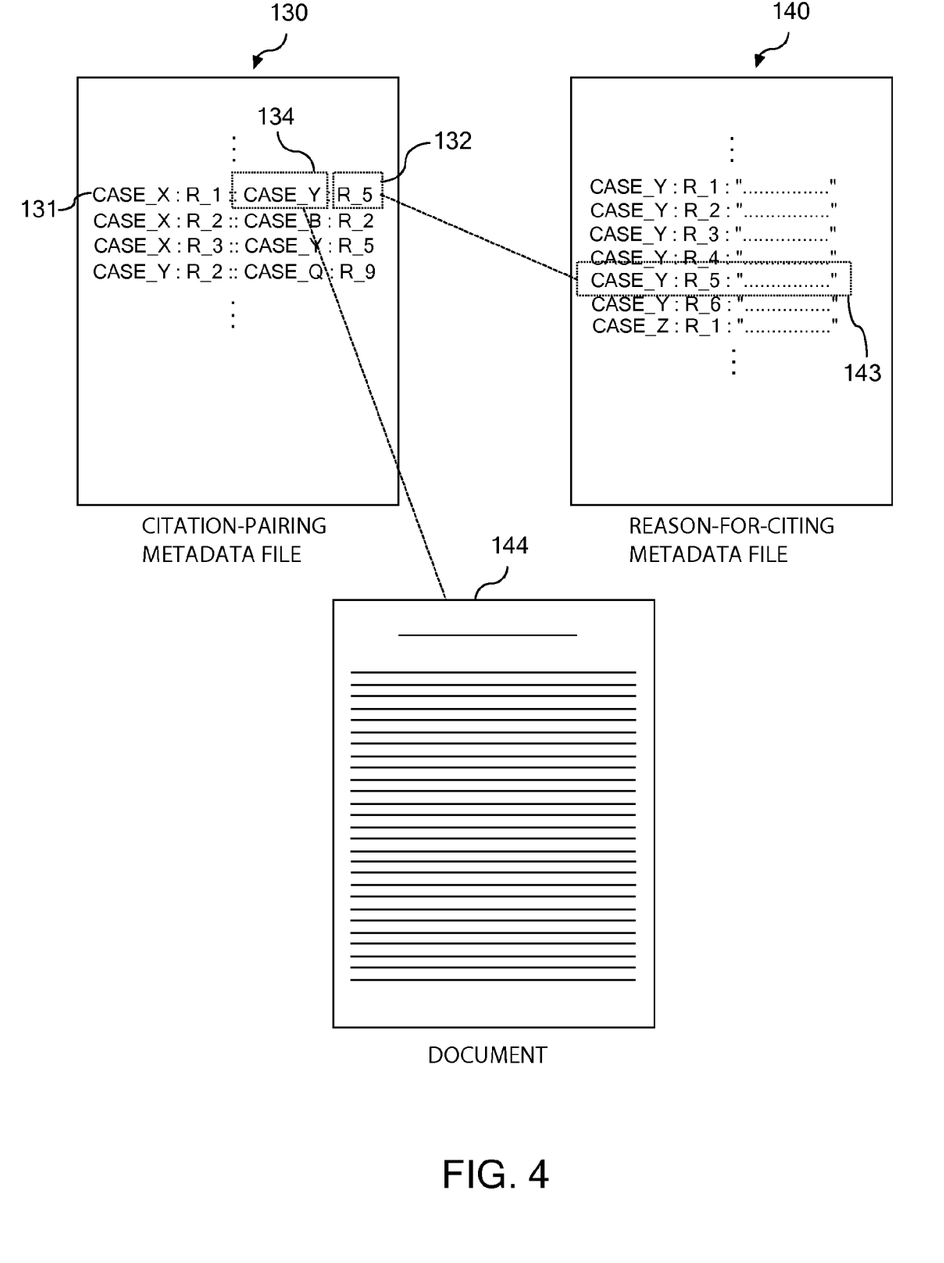
FIG. 4 depicts a schematic illustration of a document, a citation-pairing metadata file, a reason-for-citing metadata file, and relationships therebetween according to one or more embodiments shown and described herein.

Referring now to FIG. 4, a schematic illustration of a document 144, a citation-pairing metadata file 130 and a reason-for-citing metadata file 140 are illustrated. The document 144, citation-pairing metadata file 130 and reason-for-citing metadata file 140 are stored separately from one another. The citation-pairing metadata file 130 comprises a plurality of citation entries (e.g., citation entry 131). Depending on the size of the corpus, the citation-pairing metadata file 130 may have hundreds of thousands of citation entries. Each citation entry has semantic-pairing information associated therewith. The citation-pairing metadata file 130 may be accessed by a computer system to obtain information regarding passages relevant to particular issues or topics, or to find documents that discuss particular issues. As illustrated in FIG. 4, CASE_Y may contain linking information that, when accessed by an end-user and/or a computerized system, may retrieve the actual text of the document 144 corresponding to the CASE_Y CitedCaseID 134. For example, a user may initiate query using a software program configured to access the citation-pairing metadata file 130 to retrieve cases that cite a particular reason-for-citing.

The reason-for-citing metadata file 140 includes many reason-for-citing entries (e.g., reason-for-citing entry 143). The purpose of the reason-for-citing metadata file 140 is to provide the actual text string of reasons-for-citing associated with the documents in the corpus. As illustrated in FIG. 4, each reason-for-citing entry within the reason-for-citing metadata file 140 has information related to reasons-for-citing associated with each document in the corpus. In one embodiment, the reason-for-citing entry may have the following format:

CaseID:Reason-For-CitingID:Text_of_Reason-for-Citing

The CaseID may be the same document identifier described above, wherein the document identifier points to or is otherwise associated with a particular document in the corpus. The Reason-For-CitingID may be as described above and points to the particular reason-for-citing within the associated document. The Text_of_Reason-for-Citing contains the actual text string of the reason-for-citing (or cited-text-area) within the document. As shown in FIG. 4, each case may contain a plurality of reasons-for-citing/cited-text-areas. For example, "CASE_Y" has six reasons-for-citing. In one embodiment, all of the documents of the corpus are stored in a single reason-for-citing metadata file. Alternatively, more than one reason-for-citing metadata file may be used. In one embodiment, each document may have its own reason-for-citing metadata file.

The reason-for-citing metadata file 140 may be accessed via the citation-pairing metadata file 130 to obtain the text strings associated with reasons-for-citing and cited-text-areas within documents. In this manner, the citation-pairing metadata file 130 may be smaller in size because the text strings of each reason-for-citing/cited-text-area are not stored in the citation-pairing metadata file 130 but rather in the reason-for-citing metadata file.

Referring to FIG. 4 as an example, reason-for-citing/cited-text-area "R__5" of "CASE_Y" of the citation-pairing metadata file 130 (e.g., identifiers 134 and 132 of citation entry 131) may point to reason-for-citing entry 143 of the reason-for-citing metadata file 140. Reason-for-citing entry 143 is directed to the fifth reason-for-citing ("R__5") of the document CASE_Y. Reason-for-citing entry 143 also contains the text string of the reason-for-citing.

The citation-pairing metadata file and reason-for-citing metadata file enable the storage of voluminous amounts of data relating to documents, citations, related text passages and links in a relatively compact and easily-accessed format. The metadata is configured in such a way that allows for quick access and linking to support various software programs and applications, such as searching applications (e.g., more-like-this searching programs), issue libraries (i.e., groups of documents and/or issues/topics), and support of a citation network viewer in which the end-user may graphically view the citation network and sub-networks.

Software programs and applications may use the citation-pairing metadata file 130 and reason-for-citing metadata file 140 as described above to provide an end-user with the reasons-for-citing for the particular issues/topics he or she may be interested in. The end-user may perform a "more-like-this" search in which the software program accesses additional documents and reasons-for-citing related to the particular issue at hand.

Using the embodiments described herein, documents may be linked together beyond simple citation patterns alone or text matching alone. The metadata described herein can be used to link passages from different documents discussing the same topic/issue. It may give researchers the ability to search document citations based on topics as well as citation. Embodiments may improve any search when an end-user is presented with a passage and hopes to find additional documents resembling the passage. Software programs using the embodiments described herein may proactively choose passages behind the scenes (using the citation-pairing metadata and reason-for-citing metadata) that are relevant to an end-user's search activities even when dissimilar language is used.

Figure 5:
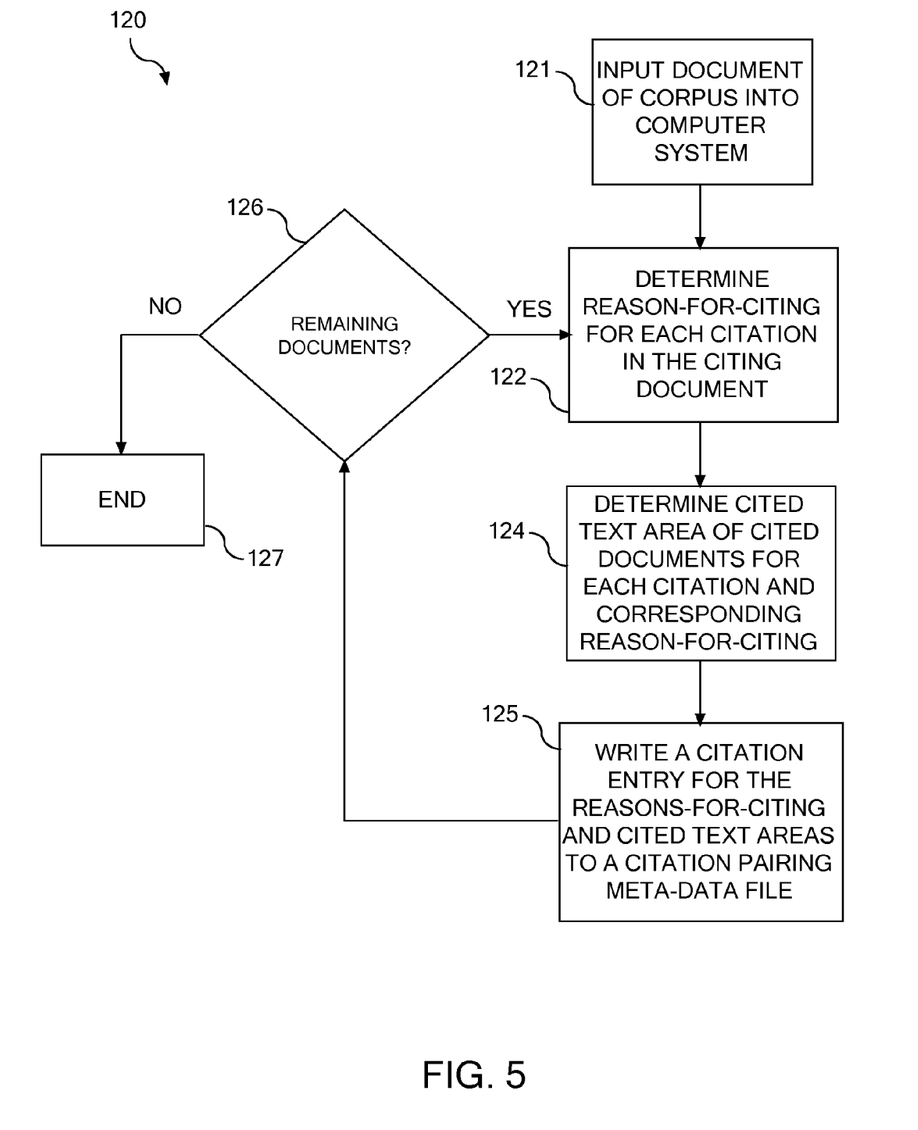
FIG. 5 depicts a flowchart illustration of a process for creating a citation-pairing metadata file according to one or more embodiments shown and described herein.

The creation of the pairing information and data that is populated into the citation-pairing metadata file will now be described. FIG. 5 illustrates a flowchart 120 that describes the process of creating the citation-pairing metadata file by populating the file with citation-pairing entries. The text of documents with a document corpus are input into a computer system at block 121. The computer system has computer code stored thereon that is operable to perform the various functions described herein. The corpus may be a legal corpus of a particular court or group of courts. For example, the legal corpus may be the all federal courts of appeals and the documents may be all judicial opinions (cases) associated with the federal courts of appeal. The corpus may also be a single court, such as the Court of Appeals for the Federal Circuit or the California Court of Appeal, for example. The legal corpus may also be an entire universe of legal opinions that span all state, federal and local courts.

At block 122, a reason-for-citing is determined for each citation within the document. The reasons-for-citing may be determined via the use of a reason-for-citing algorithm that is configured for identifying text in a citing court case near a citation (i.e., a citing instance), which indicates the reason(s) for citing. The reason-for-citing algorithm aids in the development of the citation-pairing metadata file by correctly locating reason-for-citing and cited-text-areas, as well as their respective boundaries within the document. One embodiment of a reason-for-citing algorithm is described in U.S. Pat. No. 6,856,988, which is incorporated herein by reference as though fully set forth in its entirety. Generally, the reason-for-citing algorithm includes the steps of: obtaining contexts of the citations (i.e., citing instances) in the citing document (each context including text that includes the citation and the text that is near the citation), analyzing the content of the contexts, and selecting (from the citing instances' context) text that constitutes the reason-for-citing, based on the analyzed content of the contexts. The boundaries of the determined reasons-for-citing may be marked within the text of the document. For example, the boundaries may be marked with XML tags that delineate the text of the reasons-for-citing from the remaining text of the document. Subsequent processes, such as the processes described below, may use the XML tags or other markers to determine the locations of the various reasons-for-citing.

Figure 6:
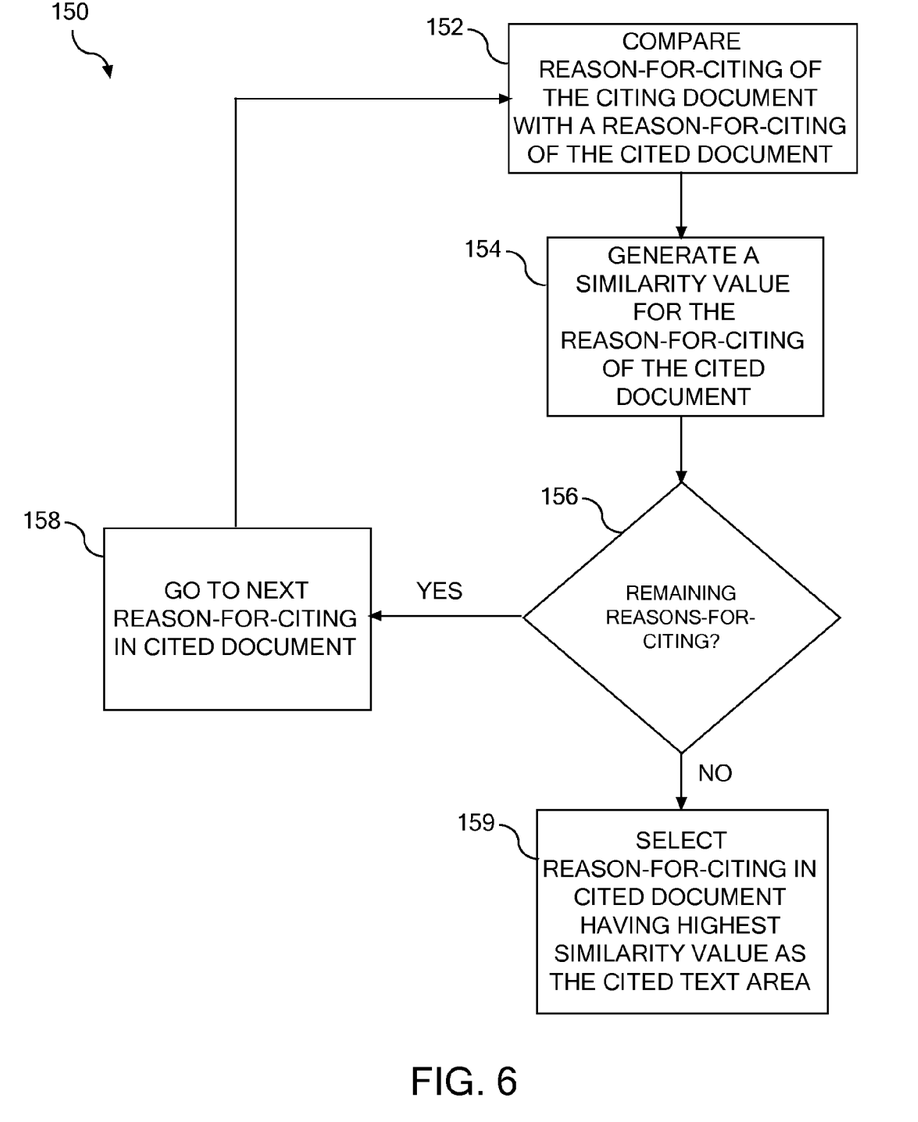
FIG. 6 depicts a flowchart illustration of a process for semantically pairing a reason-for-citing of a citing document with a cited-text-area of a cited document.

At block 124, the text area of a cited document that the citing document is citing is located. This step finds the text area in the cited document that is most semantically-equivalent to the reason-for-citing in the citing document. One method of determining the cited-text-area that is most semantically-equivalent to a reason-for-citing is described in U.S. Pat. No. 7,735,010, which is incorporated herein by reference as though fully set forth in its entirety. Generally, referring to the flowchart 150 of FIG. 6, the reasons-for-citing are determined in the cited document with the reasons-for-citing algorithm described above. The reasons-for-citing within the citing and cited documents are turned into vectors (e.g., by the use of key term extraction, lexical normalization, weighing, etc.). The vectors of the citing document and cited documents are paired and semantically compared with one another at block 152. A similarity value is established for each reason-for-citing within the cited document(s) at block 154. A vector comparison function may be used to measure the similarity between the two vectors. If there are remaining reasons-for-citing in the cited document(s) at block 156, the next reason-for-citing in a cited document is selected at block 158 and the process is repeated at block 152. If there are no more remaining reasons-for-citing at block 156, the reason-for-citing of a particular cited document having the highest similarity value is selected as the cited-text-area at block 159.

Referring once again to FIG. 5, after the cited-text-areas of the cited documents are determined at block 124, a citation entry is written for each reason-for-citing of the citing document into the citation-pairing metadata file at block 125. As described above, a citation entry contains information related to the citing document, the reason-for-citing of the citing document, the cited document, the reason-for-citing (or cited-text-area) of the cited document, and the similarity value. At block 126 it is determined whether or not there are remaining documents in the corpus. If yes, the process is repeated at block 122. If no, the process ends at block 127. In this manner, citation entries regarding semantically-paired documents and passages for each document in the corpus may be recorded in the citation-pairing metadata file.

It should now be understood that the embodiments described herein may enable the efficient storage of information relating to semantic links between citing and cited documents within a document corpus. Semantic-pairing information is written as citation entries into a citation metadata file that may be retrieved to enhance research and searching. The citation-pairing metadata file provides a platform for quick accesses to the citing document, reasons-for-citing within the document, as well as the cited-text-area within a cited document. Further, a reason-for-citing metadata file may also be associated with the citation-pairing metadata file and provide text strings corresponding to particular reasons-for-citing or cited-text-area of the cited document. The information stored within the citation-pairing metadata file and the reason-for-citing metadata file may be used for any number of researching applications, such as more-like-this searching and issue/topic libraries.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer-implemented method of semantically linking a citing document to a cited document in a corpus of documents, the method comprising:
   locating at least one citation present in the citing document;
   determining a reason-for-citing for the at least one citation;
   determining a cited-text-area present in the cited document, wherein the cited-text-area corresponds with the reason-for-citing, and the cited-text-area is determined by:
      semantically comparing the reason-for-citing in the citing document with reasons-for-citing in the cited document;
      generating a similarity value for each reason-for-citing in the cited document based on the semantic comparison with the reason-for-citing in the citing document; and
      selecting the reason-for-citing in the cited document with a highest similarity value as the cited-text-area of the cited document; and
   populating, by a computing device, a citation entry of a citation-pairing metadata file, the citation entry comprising a citing-document identifier, a reason-for-citing identifier, a cited-document identifier, and a cited-text-area identifier, wherein the citation-pairing metadata file comprises a plurality of citation entries and is stored separately from the citing document and the cited document.

2. The computer-implemented method of claim 1, wherein the reason-for-citing is determined by a reason-for-citing algorithm.

3. The computer-implemented method of claim 1, wherein the method further comprises populating the citation entry with the highest similarity value.

4. The computer-implemented method of claim 1, further comprising populating a reason-for-citing metadata file with a plurality of reasons-for-citing entries, each reason-for-citing entry comprising a document identifier, a reason-for-citing identifier, and a string of text corresponding to the reason-for-citing identifier, wherein each reason-for-citing entry corresponds with the reasons-for-citing in the citing document and the cited-text-areas in the cited document.

5. The computer-implemented method of claim 4, wherein the citation-pairing metadata file is configured such that:
selection of a reason-for-citing identifier of a selected citation entry accesses the reason-for-citing metadata file to retrieve the string of text associated with the selected reason-for-citing identifier; and
selection of a cited-text-area of a selected citation entry accesses the reason-for-citing metadata file to retrieve the string of text associated with the selected cited-text-area.

6. The computer-implemented method of claim 1, wherein the citing-document identifier contains linking information that accesses a text of the citing document.

7. A computer-implemented method of storing semantics-based citation-pairing information comprising:
generating, by a computing device, a citation-pairing metadata file;
writing a plurality of citation entries to the citation-pairing metadata file for individual ones of a plurality of documents included in a corpus of documents, each citation entry comprising:
a citing-document identifier corresponding to a citing document,
a reason-for-citing identifier corresponding to a reason-for-citing for a citation of the citing document,
a cited-document identifier corresponding to a cited document cited by the citing document, and
a cited-text-area identifier corresponding to an area of text in the cited document that is cited by the citing document, wherein the area of text in the cited document is determined by:
semantically comparing the reason-for-citing in the citing document with reasons-for-citing in the cited document;
generating a similarity value for each reason-for-citing in the cited document based on the semantic comparison with the reason-for-citing in the citing document; and
selecting the reason-for-citing in the cited document with a highest similarity value as the cited-text-area of the cited document; and
electronically storing the citation-pairing metadata file separately from the plurality of documents.

8. The computer-implemented method of claim 7, wherein the reason-for-citing is determined by a reason-for-citing algorithm.

9. The computer-implemented method of claim 7, wherein the method further comprises populating the plurality of citation entries with the highest similarity value for each selected cited reason-for-citing.

10. The computer-implemented method of claim 7, further comprising populating a reason-for-citing metadata file with a plurality of reason-for-citing entries, each reason-for-citing entry comprising a document identifier, a reason-for-citing identifier, and a string of text corresponding to the reason-for-citing identifier, wherein each reason-for-citing entry corresponds with the reasons-for-citing in the citing document or the cited-text-areas in the cited document.

11. The computer-implemented method of claim 10, wherein the citation-pairing metadata file is configured such that:
selection of a reason-for-citing identifier of a selected citation entry accesses the reason-for-citing metadata file to retrieve the string of text associated with the selected reason-for-citing identifier; and
selection of a cited-text-area of a selected citation entry accesses the reason-for-citing metadata file to retrieve the string of text associated with the selected cited-text-area.

12. The computer-implemented method of claim 7, wherein the citing-document identifier contains linking information that accesses a text of a selected citing document.

13. A computer-readable memory comprising a set of computer-readable instructions for carrying out a method of semantically linking a citing document to a cited document that, when used in conjunction with a computer having a processor, causes the processor to:
determine a reason-for-citing for at least one citation present in the citing document;
determine a cited-text-area present in the cited document, wherein the cited-text-area corresponds with the reason-for-citing, and the cited-text-area is determined by:
semantically comparing the reason-for-citing in the citing document with reasons-for-citing in the cited document;
generating a similarity value for each reason-for-citing in the cited document based on the semantic comparison with the reason-for-citing in the citing document; and
selecting the reason-for-citing in the cited document with a highest similarity value as the cited-text-area of the cited document; and
populate a citation entry of a citation-pairing metadata file with a citing-document identifier, a reason-for-citing identifier, a cited-document identifier, and a cited-text-area identifier, wherein the citation-pairing metadata file comprises a plurality of citation entries and is stored separately from the citing document and the cited document.

14. The computer-readable memory of claim 13, wherein the method further comprises populating the citation entry with the highest similarity value.

15. The computer-readable memory of claim 13, further comprising populating a reason-for-citing metadata file with a plurality of reason-for-citing entries, each reason-for-citing entry comprising a document identifier, a reason-for-citing identifier, and a string of text corresponding to the reason-for-citing identifier, wherein each reason-for-citing entry corresponds with reasons-for-citing in the citing document and cited-text-areas in the cited document.

16. The computer-readable memory of claim 15, wherein the citation-pairing metadata file is configured such that:
selection of a reason-for-citing identifier of a selected citation entry accesses the reason-for-citing metadata file to retrieve the string of text associated with the selected reason-for-citing identifier; and
selection of a cited-text-area of a selected citation entry accesses the reason-for-citing metadata file to retrieve the string of text associated with the selected cited-text-area.

17. The computer-readable memory of claim 13, wherein the citing-document identifier contains linking information that accesses a text of a selected citing document.

* * * * *